United States Patent [19]

Bennett et al.

[11] 4,211,278
[45] Jul. 8, 1980

[54] HEADER STRUCTURE FOR A PANEL-TYPE RADIATOR AND METHOD OF MAKING SAID STRUCTURE

[75] Inventors: Moreland P. Bennett, Hickory; Philip A. Cacalloro, Newton; Albert J. McCloy, Hickory, all of N.C.

[73] Assignee: General Electric Company, Philadelphia, Pa.

[21] Appl. No.: 946,893

[22] Filed: Sep. 28, 1978

[51] Int. Cl.$^2$ .............................................. F28F 9/26
[52] U.S. Cl. ................................... 165/130; 165/173; 165/178; 228/183
[58] Field of Search ............... 165/106, 170, 175, 173, 165/178, 130, 131; 29/157.3 D, 157.3 V; 113/118 R, 118 D, 118 V; 228/183

[56] References Cited

U.S. PATENT DOCUMENTS

| | | | |
|---|---|---|---|
| 752,844 | 2/1904 | Kinnear | 122/DIG. 13 |
| 1,492,136 | 4/1924 | Low | 165/106 |
| 1,619,332 | 3/1927 | Dann | 165/106 |
| 3,506,064 | 4/1970 | Appleyard et al. | 165/106 |
| 3,537,165 | 11/1970 | Paddock et al. | 113/118D |
| 3,650,321 | 3/1972 | Kaltz | 165/106 |

FOREIGN PATENT DOCUMENTS 68831  3/1941  Czechoslovakia ........................ 165/178

OTHER PUBLICATIONS

Welding Handbook, 6th Edition, Sec. 2, pp. 23.1, 23.3, 23.4, 23.7, 23.28, Published by American Welding Society, 1969.

*Primary Examiner*—Sheldon Richter
*Attorney, Agent, or Firm*—William Freedman

[57] ABSTRACT

In this panel-type radiator a pair of panels are disposed in adjacent, side-by-side relationship, and each is made of two thin dished sheets of steel. Adjacent sheets of the adjacent panels are each provided with a thin-walled embossment of generally truncated conical form having a central opening extending through its outer end. Each embossment also comprises a radially-extending flange surrounding the opening and an annular portion of rounded cross-section joining the flange and the generally conical portion of the embossment. The flanges are disposed in juxtaposition with the openings generally aligned, thus providing externally of the flanges a groove of generally V-shaped cross-section between the annular portions of the embossments. A deposit of silicon bronze forms a brazed joint between the embossments, and this deposit comprises an annular filet of silicon bronze disposed in the V-shaped groove and a film of silicon bronze between the juxtaposed flanges.

3 Claims, 6 Drawing Figures

HEADER STRUCTURE FOR A PANEL-TYPE RADIATOR AND METHOD OF MAKING SAID STRUCTURE

BACKGROUND

This invention relates to header structure for a panel-type radiator and also to a method of making such header structure.

A panel-type radiator typically comprises a plurality of spaced-apart panels joined together at opposite ends of the radiator through two spaced-apart header structures that connect the panels in hydraulically-parallel relationship. Each of the panels is usually made of dished steel sheets welded together. These sheets are usually of a very thin-walled construction so as to facilitate the desired heat-transfer through the panel walls and also to facilitate their fabrication by a stamping and drawing operation.

Problems have been encountered in providing the header structures for joining the panels. Typically, these header structures are incorporated by welding or brazing operations, but the thin-walled construction of the panels has made it difficult to provide strong, leak-proof joints in the header structure. Sometimes the welding heat, particularly if derived from an arc, has melted through the thin sheets. Sometimes the welds or brazes are unduly porous. And sometimes the welds or brazes are not properly located in the finished structure to provide effective seals and strong joints. For several reasons it is especially difficult to properly locate the welds or brazes in a fully mechanized joining operation that relies upon an electric arc for heating. One reason is that the thin-walled sheets tend to distort in response to the heat of the arc, slightly changing the location of the interface that is being joined without a corresponding alteration in the path of the welding or brazing gun. Another reason is that sometimes slight bends or kinks develop in the free end of the welding wire used in gas metal-arc welding, and these tend to interfere with placement of the weld precisely in the desired location. And if the welding wire is of magnetic material, magnetic disturbances which affect the wire position can interfere with the desired precision in locating the weld.

SUMMARY

An object of our invention is to provide, for a panel-type radiator, header structure that is simple and inexpensive and readily lends itself to fabrication by a mechanized arc welding or brazing operation.

Another object is to provide header structure that readily lends itself to precise placement of welds or brazes by an arc welding or brazing process despite the thin-walled construction of the parts being joined.

Another object is to provide, for making a header structure for a panel-type radiator, a method that relies upon an arc-type welding or brazing gun and is exceptionally tolerant of minor variations in the relative position of the gun and the interface being joined, thus lending itself especially well to mechanization.

In carrying out our invention in one form, we provide a panel-type radiator that comprises a pair of panels disposed in side-by-side relationship, each panel being made of two thin dished sheets of steel. Adjacent sheets of the adjacent panels are each provided with a thin-walled embossment of generally truncated conical form having a centrally-disposed opening extending through the outer end of the embossment. Each embossment further comprises a flange surrounding the opening and extending radially with respect to the opening and an annular portion of rounded cross-section joining the flange and the generally conical portion of the embossment. The flanges of said embossments are disposed in juxtaposition with said openings generally aligned, thus providing externally of the flanges a groove of generally V-shaped cross-section between said annular portions of the two embossments. A deposit of silicon bronze forms a brazed joint between said embossments, and this deposit comprises an annular filet of silicon bronze disposed in said V-shaped groove and a film of silicon bronze between said juxtaposed flanges.

BRIEF DESCRIPTION OF DRAWINGS

For a better understanding of the invention, reference may be had to the following description taken in connection with the accompanying drawings, wherein.

DETAILED DESCRIPTION OF PREFERRED EMBODIMENT

Figure 1:
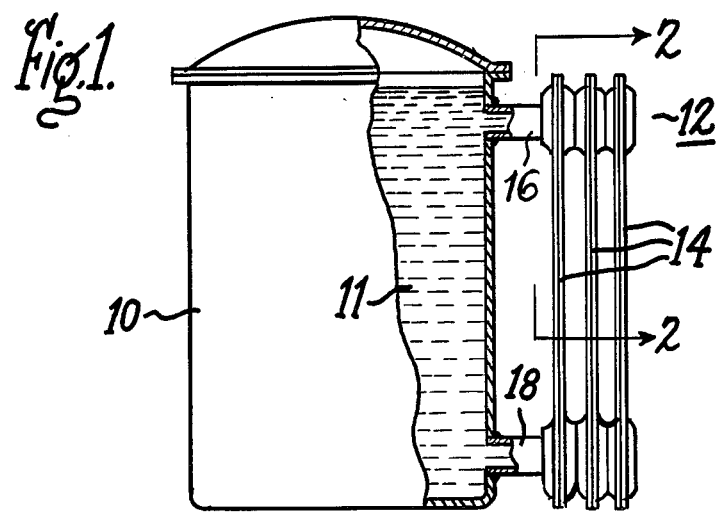
FIG. 1 is a side elevational view, partly in section, showing liquid-filled electrical apparatus having a panel-type radiator embodying one form of the present invention.

Referring first to FIG. 1, there is shown electrical apparatus, such as a distribution transformer or a voltage regulator, comprising a metal tank 10 filled with dielectric fluid 11 such as oil. Attached to the side of the tank is a panel type radiator 12 comprising a plurality of vertically-extending panels 14 disposed in side-by-side, horizontally spaced-apart relationship. The radiator 12 includes upper and lower ends communicating with the interior of the tank 10 at its upper and lower ends, respectively. The normal liquid level of the oil 11 in the tank 10 is above the location of the upper header pipe 16.

When the electrical apparatus is in operation, the oil in the tank 10 becomes heated. The hottest oil rises to the top of the tank through natural convection, entering the radiator through the upper pipe 16. As the oil is cooled within the radiator 12, it flows downwardly through the panels 14, returning to the tank interior through the lower pipe 18 as relatively cool oil. The oil continues circulating over this path, moving upwardly within the tank 10 and downwardly within the radiator 12, as the electrical apparatus is operated. The radiator, of course, serves to extract heat from the oil as it flows downwardly therethrough, thus limiting the temperature of the oil within tank 10.

Figure 2:
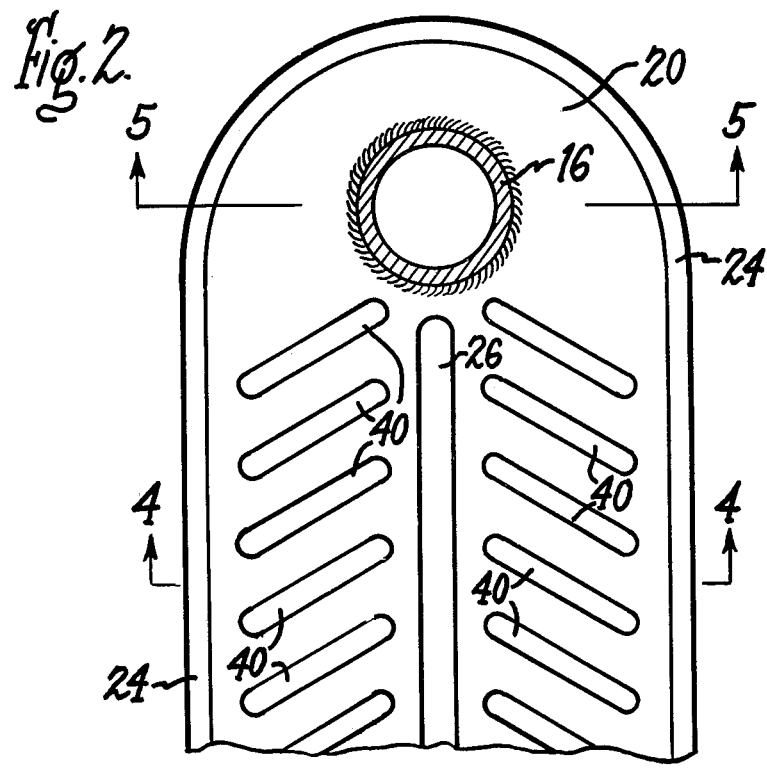
FIG. 2 is an enlarged sectional view along the line 2—2 of FIG. 1.
Figure 4:
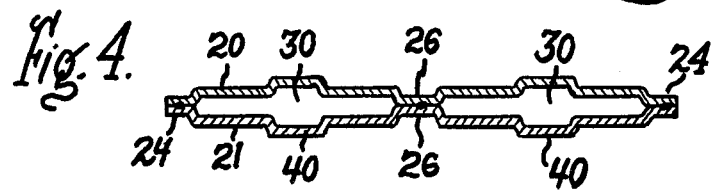
FIG. 4 is an enlarged sectional view along the line 4—4 of FIG. 2.
Figure 3:
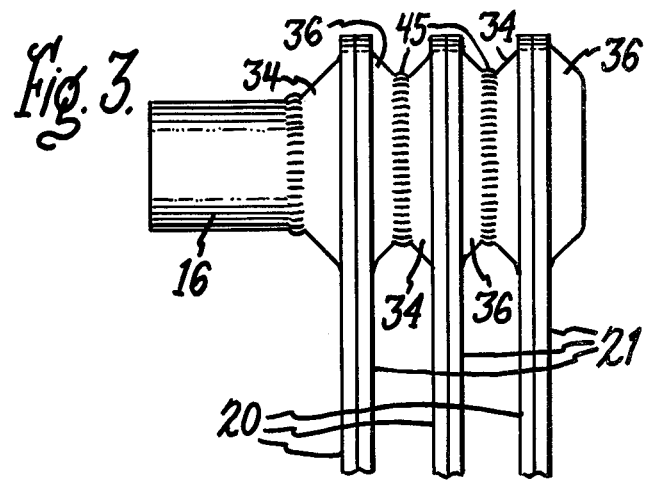
FIG. 3 is an enlarged view of a portion of FIG. 1.

Referring to FIGS. 2, 3, and 4, each of the radiator panels 14 comprises two dished, metal sheets 20 and 21 respectively forming halves of the panel. These sheets 20 and 21 have substantially aligned perimeters 24 and are seam welded to each other along these aligned perimeters. Each of the sheets 20 and 21 has a vertically-extending medial debossment 26. These debossments 26 are aligned with respect to each other and are spot welded together at their abutting inner ends along a vertically-extending zone, as seen in FIG. 2. These aligned debossments 26 divide the panel into two spaced-apart, side-by-side vertically-extending flow channels 30 located between sheets 20 and 21 on opposite sides of the aligned debossments 26. For promoting heat transfer, each sheet 20 and 21 contains vertically-spaced embossments 40 arranged on each sheet in a generally herringbone pattern. These panels are described in more detail and claimed in our Application Ser. No. 936,983 filed on Aug. 25, 1978.

To facilitate heat transfer through the panel walls and also to facilitate fabrication of the formed sheets through a stamping and drawing operation, it is desirable that the sheets be of a thin-walled material, e.g., 18 gauge steel sheet. Such sheet has a thickness of about 0.048 inch, but in the regions where it is severely drawn, e.g., in the region of portions 38 and 39 of the embossments 34 and 36 (soon to be described) the wall thickness is typically as little as 0.038 to 0.040 inches.

The panels 14 are connected in hydraulically parallel relationship by two substantially identical header structures, one located at the upper end and one located at the lower end of the panels. Each of these header structures comprises aligned embossments 34 and 36 on opposite sides of each panel, the embossments on adjacent panels being disposed in aligned relationship and brazed or welded together. The embossment 34 at one side of each panel is integral with the sheet 20 forming that side of the panel, and the embossment 36 at the other side of each panel is integral with the sheet 21 forming this other side of the panel.

Figure 5:
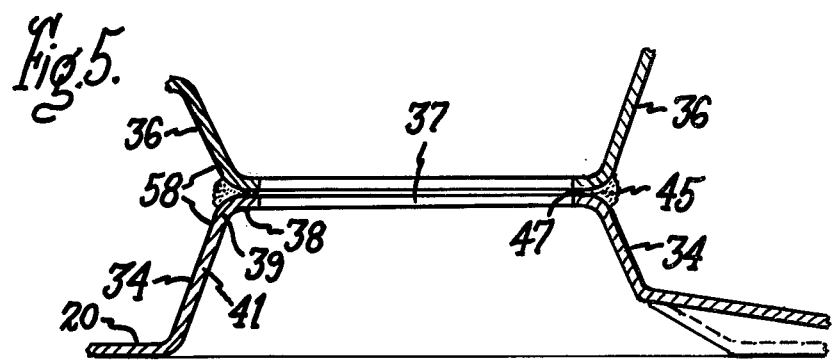
FIG. 5 is an enlarged sectional view along the line 5—5 of FIG. 2.

As shown in FIG. 5, each embossment 34 or 36 is of a generally truncated conical form. Each of these embossments, except the one on the outer sheet of the outermost panel, has a centrally-disposed opening 37 extending through the outer end of the embossment. Each of these embossments further comprises a flange 38 surrounding the centrally-disposed opening 37 and extending generally radially with respect to the opening and an annular portion 39 of rounded cross-sectional form joining the flange 38 and the generally conical portion 41 of the embossment.

As shown in FIG. 5, the flanges 38 of the adjacent embossments 34 and 36 are disposed in juxtaposed relationship with the central openings 37 substantially aligned. This disposition of the parts results is the presence externally of the flanges of a groove of generally V-shaped cross-section between the rounded annular portions 39 of the two adjacent embossments.

Within this V-shaped groove there is a deposit of silicon bronze brazing alloy forming a brazed joint between the adjacent embossments 36 and 34. This deposit of brazing alloy comprises an annular filet 45 of silicon-bronze disposed in the V-shaped groove and bonded to the annular rounded portions 39 and also a film 47 of silicon bronze between the juxtaposed flanges 38 and bonded to the flanges.

Figure 6:
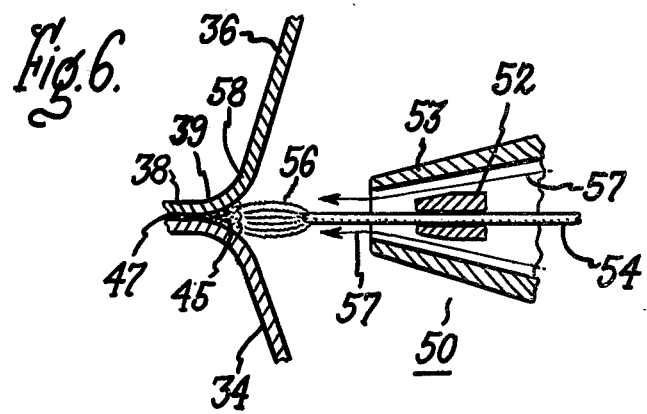
FIG. 6 is an enlarged view of a portion of FIG. 5 showing how a brazed joint in the header structure is made in accordance with one form of our invention.

The deposit of silicon bronze is applied by a brazing process, depicted in FIG. 6, that is a form of gas metal-arc welding, or MIG welding. More specifically, a gun 50 is utilized which comprises a hollow metal contact 52 through which a wire 54 of consumable filler metal is fed. An arc 56 is established between the end of the wire and the work piece, which results in the end of the wire being melted by the arc to produce droplets of the wire material which are moved through the arc discharge onto the work. Shielding to protect the fluid weld metal from oxidation or contamination by the surrounding atmosphere is provided by an externally supplied flow of inert gas, preferably argon. This flow of gas is controlled by a tubular ceramic nozzle 53 surrounding the contact 52 and providing an annular passageway between the nozzle and the contact through which the inert gas flows, as depicted by arrows 57, to envelope the arc and the still-molten deposit. As the end of the wire melts, additional wire is fed into the arcing zone by driving the wire forward by a suitable wire drive (not shown) from a suitable reel (not shown). This gun is of a generally conventional design, such as depicted, for example, in FIG. 23.2, page 23.4 of the Welding Handbook, Sixth Edition, Section Two, published by the American Welding Society in 1969.

In accordance with one form of our invention, we utilize consumable wire of silicon bronze, thereby producing the above-described deposit of silicon bronze between the embossments. Wires of different diameters have been found satisfactory, but diameters in the range of 0.025 to 0.060 inches have been found to be optimum. In practicing our invention in one specific form, we use a flow rate of 26 cubic feet per minute for the argon gas; pulse arc d.c. current; 100 to 150 amperes of current; reverse polarity; a distance of 1 to 1¼ inches from the end of contact 52 to the joint; and move the gun past the weld area at a speed of about 24 inches per minute. These parameters are supplied by way of example and not limitation.

In one form of the invention, we produce the annular deposit of braze metal by moving the gun in a circular path around the annular V-shaped groove. It is to be understood, however, that the process could also be practiced by holding the gun stationary and rotating the work piece about its central longitudinal axis through a single revolution past the gun.

The use of silicon bronze wire instead of conventional steel wire for forming the joint has a number of important advantages. When conventional steel wire was used, it was found very difficult to avoid arc melt-through of the thin walls of the embossments in the regions 39 and the immediately adjacent regions 58. The steel wire requires higher welding temperatures than the silicon bronze wire, and the thin walls of the embossments are more susceptible to arc melt-through at such temperatures. Another problem encountered with steel wire was that it was difficult to consistently cause the weld deposit to be located at the center of the joint, i.e., at the vertex of the V-shaped groove. The steel wire deposit has less tendency to flow toward this vertex region than the silicon bronze deposit. The silicon bronze has more opportunity for flow because of its lower solidification temperature, and also it is attracted more strongly toward the vertex region by capillary action than is the steel deposit. Metallographic studies made on joints including the silicon bronze have, as a matter of fact, shown that the silicon bronze actually forms a film in the interface region between the two flanges 38. Our studies indicate that the presence of this film results from capillary action that attracts the molten silicon bronze into this interface region.

It is to be further noted that the silicon bronze is essentially non-magnetic and the free end of the wire is therefore less susceptible to being inadvertently displaced by magnetic disturbances than is the usual steel filler wire.

Joints were also made using aluminum bronze wire instead of the above-described silicon bronze. These joints were substantially inferior to the silicon bronze joints because the deposit of weld material was much more porous and there seemed to be insufficient capillary action to develop a film between the flanges 38. The low porosity of the silicon bronze deposit and the film between the flanges 38 contribute to a more leak-resistant joint.

When performing the welding or brazing operation with fully mechanized equipment, it is difficult to compensate for minor deviations in the location of the interface with respect to the end of the feed wire and for other unpredictable variances such as kinks or bends appearing near the free end of the wire 54 as it emerges from the contact 52. The above-described improved flow of the silicon bronze deposit and the stronger capillary action play an important role in compensating for such variations since they result in the deposit being drawn completely into the V-shaped groove despite minor variations in the initial location of the deposit. Also, because lower welding temperatures are employed with the silicon bronze wire than with conventional steel wire, there is less tendency for the thin-walled embossments to distort in response to the heat of the welding operation, thus making more constant and predictable the location of the interface with respect to the end of the wire.

The silicon bronze welding wire used in practicing our invention in a preferred form is American Welding Society A5.6 - ECUSI wire having the following composition in parts per hundred by weight:

94 copper—(minimum)
1.5 zinc—(maximum)
1.5 tin—(maximum)
1.5 manganese—(maximum)
0.5 iron—(maximum)
2.8 to 4.0 silicon While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. In a panel-type radiator,
   (a) a pair of panels disposed in side-by-side relationship, each comprising two thin dished sheets of steel joined together around their perimeters, said perimeters defining the outer edge of the panel and the sheets defining spaced walls of the panel,
   (b) a first sheet of one panel being disposed immediately adjacent a first sheet of the other panel,
   (c) each of said first sheets being provided with a thin-walled embossment of generally truncated conical form having a centrally-disposed opening extending through the outer end of said embossment,
   (d) each of said embossments further comprising a flange surrounding said opening and extending generally radially with respect to said opening and an annular portion of rounded cross-sectional form joining said flange and the generally conical portion of said embossment,
   (e) said flanges of said embossments being disposed in juxtaposed relationship with said openings generally aligned, thus providing externally of said flanges a groove of generally V-shaped cross-section between said annular portions of the two embossments,
   (f) a deposit of silicon bronze forming a brazed joint between said embossments comprising an annular filet of silicon bronze disposed in said V-shaped groove and bonded to said annular portions and a film of silicon bronze between said juxtaposed flanges and bonded to said flanges.

2. In a method of making a panel-type radiator of the construction defined in claim 1, the steps of:
   (a) locating said pair of panels in adjacent relationship with said flanges disposed in juxtaposition with said openings generally aligned, thus providing externally of said flanges a groove of generally V-shaped cross-section disposed between said annular portions of the two embossments, and
   (b) introducing molten silicon bronze into said V-shaped groove by a gas metal-arc welding operation that produces an annular filet of silicon bronze disposed in the V-shaped groove and a film of silicon bronze between said juxtaposed flanges.

3. In a method of making a panel-type radiator comprising a plurality of panels disposed in side-by-side relationship, each panel comprising a pair of thin dished sheets of steel joined together around their perimeters, one sheet of each of a pair of panels being provided with a thin-walled embossment of generally truncated conical form having a centrally-disposed opening extending through the outer end of said embossment, and each embossment further comprising a flange surrounding said opening and extending generally radially with respect to the opening and an annular portion of rounded cross-sectional form joining said flange and the generally conical portion of said embossment, the steps of:
   (a) locating said pair of panels in adjacent relationship with said flanges disposed in juxtaposition with said openings generally aligned, thus providing externally of said flanges a groove of generally V-shaped cross-section disposed between said annular portions of the two embossments, and
   (b) introducing molten silicon bronze into said V-shaped groove by a gas metal-arc welding operation that produces an annular filet of silicon bronze disposed in the V-shaped groove and a film of silicon bronze between said juxtaposed flanges.

* * * * *